(12) United States Patent
Wilson

(10) Patent No.: US 12,541,747 B2
(45) Date of Patent: *Feb. 3, 2026

(54) METHOD AND APPARATUS FOR CONDUCTING SECURE FINANCIAL AND INFORMATIONAL TRANSACTIONS VIA PORTABLE SMART DEVICES

(71) Applicant: Gary J. Wilson, Carmel, CA (US)

(72) Inventor: Gary J. Wilson, Carmel, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 18/391,310

(22) Filed: Dec. 20, 2023

(65) Prior Publication Data

US 2024/0202674 A1  Jun. 20, 2024

Related U.S. Application Data

(63) Continuation of application No. 16/839,690, filed on Apr. 3, 2020, now abandoned, which is a continuation of application No. 14/101,987, filed on Dec. 10, 2013, now Pat. No. 10,650,357.

(60) Provisional application No. 61/735,928, filed on Dec. 11, 2012.

(51) Int. Cl.
*G06Q 20/02* (2012.01)
*G06Q 20/32* (2012.01)
*G06Q 20/38* (2012.01)
*G07F 19/00* (2006.01)

(52) U.S. Cl.
CPC ......... *G06Q 20/02* (2013.01); *G06Q 20/3263* (2020.05); *G06Q 20/3265* (2020.05); *G06Q 20/3276* (2013.01); *G06Q 20/382* (2013.01); *G06Q 20/385* (2013.01); *G07F 19/206* (2013.01); *G07F 19/208* (2013.01)

(58) Field of Classification Search
CPC .. G06Q 20/02; G06Q 20/3276; G06Q 20/382; G06Q 20/385
See application file for complete search history.

(56) References Cited

U.S. PATENT DOCUMENTS

| 7,907,901 | B1 | 3/2011 | Khan |
| 10,650,357 | B2 | 5/2020 | Wilson |
| 2006/0033840 | A1 | 2/2006 | Diehl et al. |
| 2006/0195695 | A1 | 8/2006 | Keys |
| 2006/0282662 | A1 | 12/2006 | Whitcomb |
| 2007/0274270 | A1 | 11/2007 | Jones et al. |

(Continued)

FOREIGN PATENT DOCUMENTS

WO  2008056275 A1  5/2008

*Primary Examiner* — Arunava Chakravarti
(74) *Attorney, Agent, or Firm* — Perkins Coie LLP

(57) ABSTRACT

A technique for conducting secure financial and informational transactions via portable smart devices is disclosed, in which two transaction devices, e.g. an ATM and a smartphone or other smart connected device are both substantially simultaneously accessible by the user and are both independently connected with the account server by a secure connection between the transaction device for the ATM and a secure connection between the smartphone and a cellphone tower. Thus, authentication is provided by secure login on the two devices, i.e. the transaction device and the cellphone. Once the devices are both connected to the account server, handshaking between the two devices to confirm pairing of the right two devices is prompted, at which point, a transaction may proceed.

20 Claims, 8 Drawing Sheets

(56) References Cited

U.S. PATENT DOCUMENTS

| | | |
|---|---|---|
| 2009/0240814 A1 | 9/2009 | Brubacher et al. |
| 2009/0276347 A1 | 11/2009 | Kargman |
| 2010/0029205 A1 | 2/2010 | Lu et al. |
| 2010/0278345 A1 | 11/2010 | Alsina |
| 2011/0246363 A1 | 10/2011 | Stone |
| 2011/0314153 A1* | 12/2011 | Bathiche ............... H04W 12/06 709/225 |
| 2012/0203646 A1* | 8/2012 | Morgan ............... G06Q 20/322 705/21 |

* cited by examiner

METHOD AND APPARATUS FOR CONDUCTING SECURE FINANCIAL AND INFORMATIONAL TRANSACTIONS VIA PORTABLE SMART DEVICES

CROSS-REFERENCE TO RELATED APPLICATIONS

This application is a continuation of U.S. patent application Ser. No. 16/839,960, filed Apr. 3, 2020, which is a continuation of U.S. patent application Ser. No. 14/101,987, filed Dec. 10, 2013, which claims priority to U.S. provisional patent application Ser. No. 61/735,928, filed Dec. 11, 2012, which are incorporated herein in their entirety by this reference thereto.

TECHNICAL FIELD

The invention relates to conducting secure transactions. More particularly, the invention relates to conducting secure financial and informational transactions via portable smart devices.

BACKGROUND

It is a common practice for credit or debit card transactions to be secured only by a Personal Information Number (PIN). The card number is embossed on the card and encoded on the magnetic strip, and that number is accessible to anyone who sees the card long enough to read the number, take a picture of the card, or gets the opportunity to surreptitiously swipe the card through a magnetic strip reader. The PIN is usually four digits long and if its entry is overseen by a person or a surveillance camera, it can often be associated with that card number. Anyone who obtains the card number and the PIN may fraudulently obtain access to the account. It has recently been reported that annual global fraudulent credit/debit card losses amount to an estimated US$39 billion. Accordingly, the low level of security inherent in the existing method is a significant problem.

Sometimes another layer of security is imposed, e.g. a request for the account zip code, but the basic process is the same: an open card number is secured by a PIN or other information that is presumed to be known only by the authorized user of the account. Smart cards can encrypt the account number and therefore add another layer of security by hiding the card number, but they have not been widely adopted to date, in part because to do so would require a hardware upgrade to the large number of installed card reading devices.

SUMMARY

Embodiments of the invention provide a technique for conducting secure financial and informational transactions via portable smart devices as replacements for the traditional credit/debit card. In embodiments of the invention, instead of the account or card number being openly accessible and the transaction device, e.g. an Automatic Teller Machine (ATM), being the sole site of authentication, two transaction devices, e.g. the ATM and a smartphone or other smart device are both simultaneously accessible by the user and are both independently connected with the account server by a secure connection between the transaction device for the ATM and a secure connection between the smartphone and a cellphone tower. Thus, authentication is provided by secure login on the two devices, i.e. the transaction device (the ATM) and the cellphone. Once the devices are both connected to the account server, handshaking between the two devices to confirm pairing of the right two devices is prompted, at which point, a transaction may proceed. Thus, in this embodiment of the invention two independent devices that are both securely connected to the same account server only need to confirm mutual identity to conduct a secure transaction.

DETAILED DESCRIPTION

Definitions

For purposes of the discussion herein, the following terms shall have the ascribed meaning:

Smart Device: A class of devices which can process instructions, i.e. a computer; accept input from and give output to the user; and communicate and exchange data with the Internet and/or other computers, data servers, and other such smart devices via a camera, a display screen, a network cable, a phone line, the cellphone network, a Wi-Fi or blue-tooth link, and/or other such capabilities that exist or may be introduced. Smart devices include, but are not limited to, data servers, Automated Teller Machines (ATM), Point Of Sale (POS) devices, smartphones, touchpads, etc. and may also be referred to as transaction devices.

Secure Login: An interaction between two smart devices or between a smart device and a person using the device, which is intended to conclusively verify the identity of such a device or person to the smart device being logged into. Techniques used may include submitting an alphanumeric password, biometric scanning of the persons fingerprint, etc.

Handshaking: The conclusive, mutual verification of the identity of two smart devices with and to each other. Techniques that may be used for verification include, but are not limited to, one or more bilateral question and answer interactions. Handshaking does not provide security for the transaction, but when supervised by a computer that both devices are securely logged into and connected with, ensures that a transaction happens between the correct two devices.

Discussion

Embodiments of the invention provide a technique for conducting secure financial and informational transactions via portable smart devices as replacements for the traditional credit/debit card. In embodiments of the invention, instead of the account or card number being openly accessible and the transaction device, e.g. an Automatic Teller Machine (ATM), being the sole site of authentication, two transaction devices, e.g. the ATM and a smartphone or other smart device are both simultaneously accessible by the user and are both independently connected with the account server by a secure connection between the transaction device for the ATM and a secure connection between the smartphone and a cellphone tower. Thus, authentication is provided by secure login on the two devices, i.e. the transaction device (the ATM) and the cellphone. Once the devices are both connected to the account server, handshaking between the two devices to confirm pairing of the right two devices is prompted, at which point, a transaction may proceed. Thus, in this embodiment of the invention two independent devices that are both securely connected to the same account server only need to confirm mutual identity to conduct a secure transaction.

Figure 1:
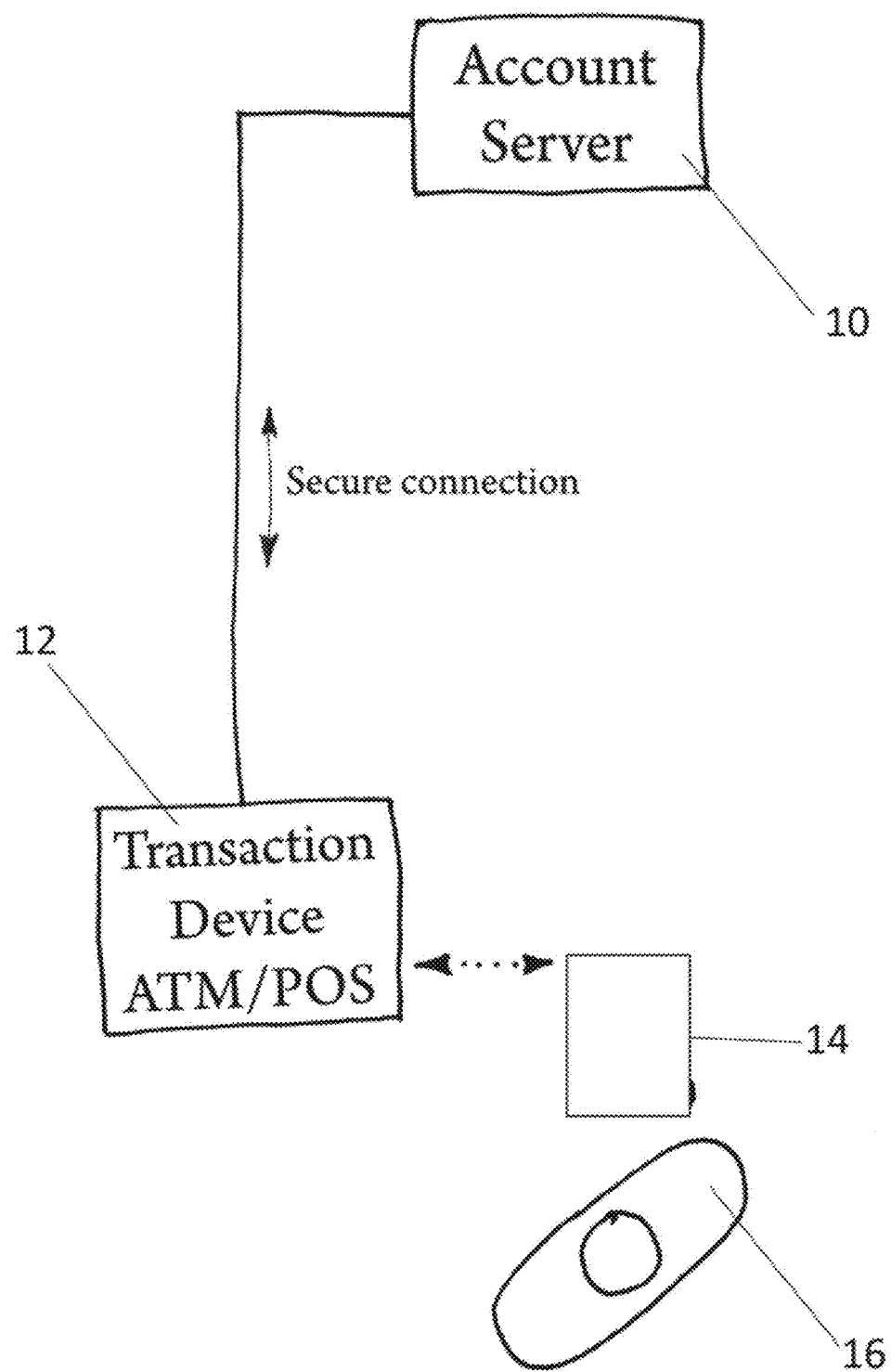
FIG. 1 is a block schematic diagram showing a state of the art approach to credit card security in connection with a transaction.

FIG. 1 is a block schematic diagram showing a state of the art approach to credit card security in connection with a transaction. In such approach, a user 16 presents a credit card 14 to a transaction device 12. The user is prompted to enter a PIN and an account server 10 authenticates the user on the basis of the card and the PIN. As discussed above, the security provided by this approach is easily circumvented.

Figure 2:
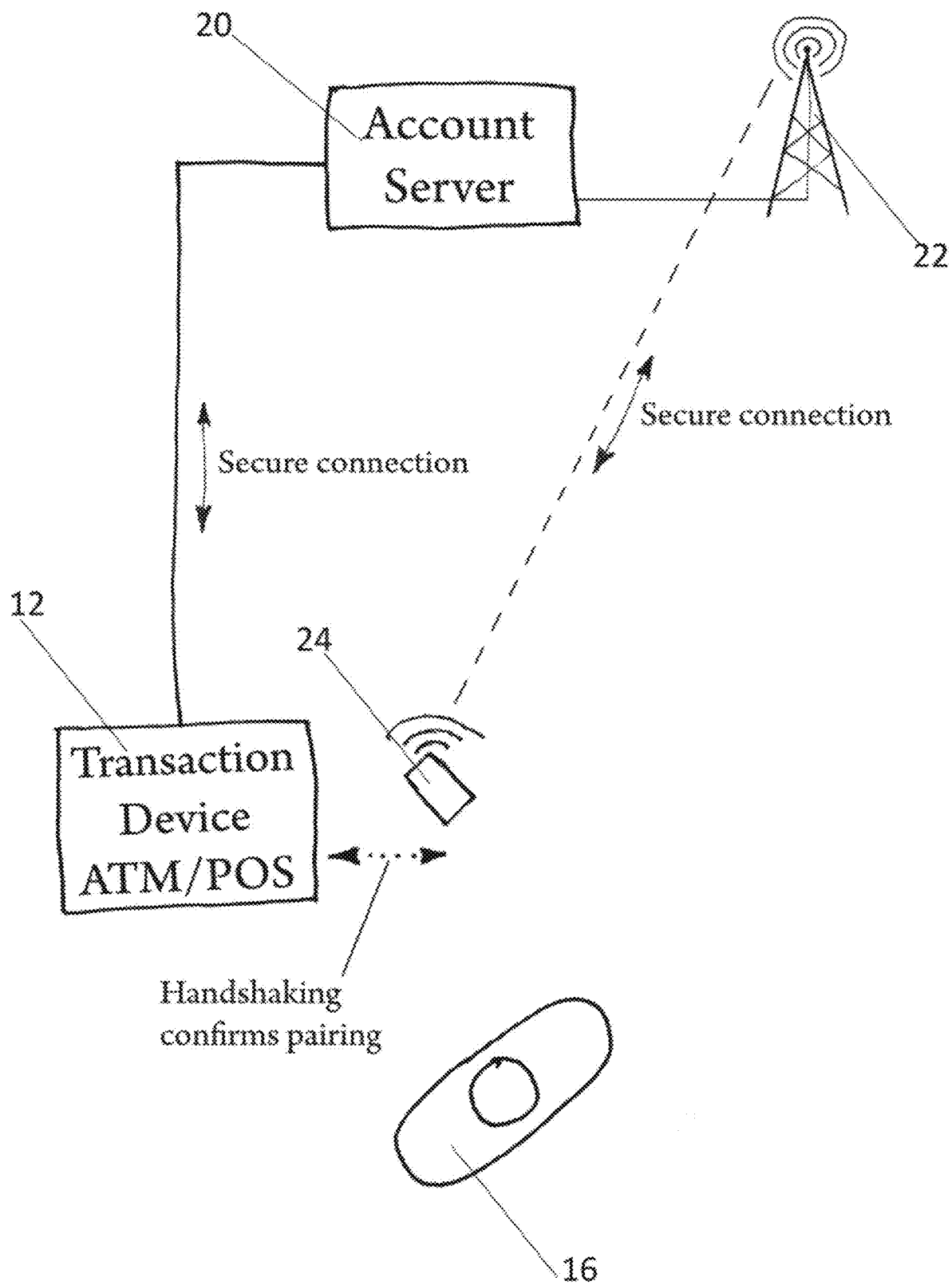
FIG. 2 is a block schematic diagram showing a method and apparatus for conducting secure financial and informational transactions via portable smart devices according to the invention.

FIG. 2 is a block schematic diagram showing a method and apparatus for conducting secure financial and informational transactions via portable smart devices according to the invention. In embodiments of the invention, instead of the account or card number being openly accessible and the transaction device, e.g. an Automatic Teller Machine (ATM), being the sole site of authentication, two transaction devices, e.g. the ATM 12 and a smartphone 24 or other smart connected device are both simultaneously accessible by the user 16 and are both independently connected with the account server 20 by a secure connection between the transaction device 12 for the ATM and a secure connection between the smartphone and a cellphone tower 22. Thus, authentication is provided by secure login on the two devices, i.e. the transaction device (the ATM) and the cellphone. Once the devices are both connected to the account server, handshaking between the two devices to confirm pairing of the right two devices is prompted, i.e. that a connection is established between the two devices, at which point a transaction may proceed. Thus, in this embodiment of the invention two independent devices that are both securely connected to the same account server only need to confirm mutual identity to conduct a secure transaction.

A major advantage to this new method is that it is a significant improvement in security with no hardware upgrade required for the installed base of ATM/POS devices or data capable, camera equipped portable smart devices. Rather, it is only necessary that a software module be added to such devices, in some embodiments of the invention, to implement the herein disclosed functionality. Those skilled in the art will appreciate that the herein disclosed invention may be practiced with any two devices, where the devices establish separate secure connections and are able to perform an authentication procedure between each other, once secure connections for each device are established. Further, while an account server is discussed herein, those skilled in the art will appreciate that such server may be provided in the form of a distributed functionality among a plurality of servers or across a network.

Example—ATM

An account holder steps up to an ATM and, instead of swiping a credit card or debit card, touches a soft key on the touch screen or a selection button labeled 'Start Transaction.' The ATM responds by requesting a Temporary Transaction Number (TTN) from a server, typically the ATM's account server. Thus, the account holder's credit card or debit card is at no point exposed during the use of the ATM machine.

The server issues a TTN, which is embedded in a 1D or 2D barcode and displayed on the ATM screen. Those skilled in the art will appreciate that the ATM need not display a barcode, but may display any other suitable indicia or image that contains the TTN.

Meanwhile, the account holder launches the secure banking application (app) on a smart device, such as a smart phone, and logs in. The account holder then presses a selection key on the banking app labeled 'ATM Transaction.'

When prompted by the app, the smart device camera is used to take a snapshot of the barcode displayed on the ATM screen. The app then resolves the barcode to the embedded TTN that was generated by the account server, and transmits this number back to the server, via the cell phone data network or Wi-Fi. In other embodiments of the invention, the barcode is resolved at the server to identify the TTN.

The server searches the currently open temporary transaction numbers and, if it finds the TTN number presented by the smart device's request, it matches up that ATM with that smart device and closes the TTN. The server now has an established link between the specific ATM and a specific account specified and authenticated during secure login on that specific smart device.

The server then posts the account nickname, e.g. the account name, user name, or other name by which the user can quickly identify that the account is the user's account, on the ATM screen so that the user can confirm that the correct account has been opened and requests the account holder's Device Identification Number (DIN), e.g. any number, such as a password, PIN, etc. the is known only to the user. After checking that the account nickname is correct, the account holder enters the DIN on the ATM keypad or touchscreen. Once the account server confirms the DIN, handshaking is complete; ATM secure login is now confirmed for those two devices, and the desired transaction can proceed.

At no time is a credit/debit card swipe or open credit/debit card number required, and the credit/debit card number is never displayed, transmitted, received, or read. When login and handshaking is complete or after a suitable timeout period, the TTN is closed, and is no longer valid. Therefore, even if the transaction is observed or recorded, the expired TTN cannot be used to re-access the account.

Variation for Point Of Sale (POS)

For POS transactions, the POS device requests the TTN from the server and then prints the barcode on the invoice. The customer then proceeds as with an ATM transaction, but scans the barcode that is printed on the invoice, instead of a barcode that is displayed on an ATM screen, with the smart device camera and then enters the DIN on the POS device keypad or touchscreen.

Variation for Website Transaction

For transactions via a website, e.g. using a browser such as Safari or Chrome, during checkout the request for the TTN is made during the seller's secure checkout procedure and the resulting barcode is then displayed in the browser window. The customer then proceeds as with an ATM transaction, but scans the barcode that is displayed on the computer screen, instead of a barcode that is displayed on an ATM screen, and then enters the DIN on the computer.

Variation for Smartphone to Smartphone Transaction

Figure 3:
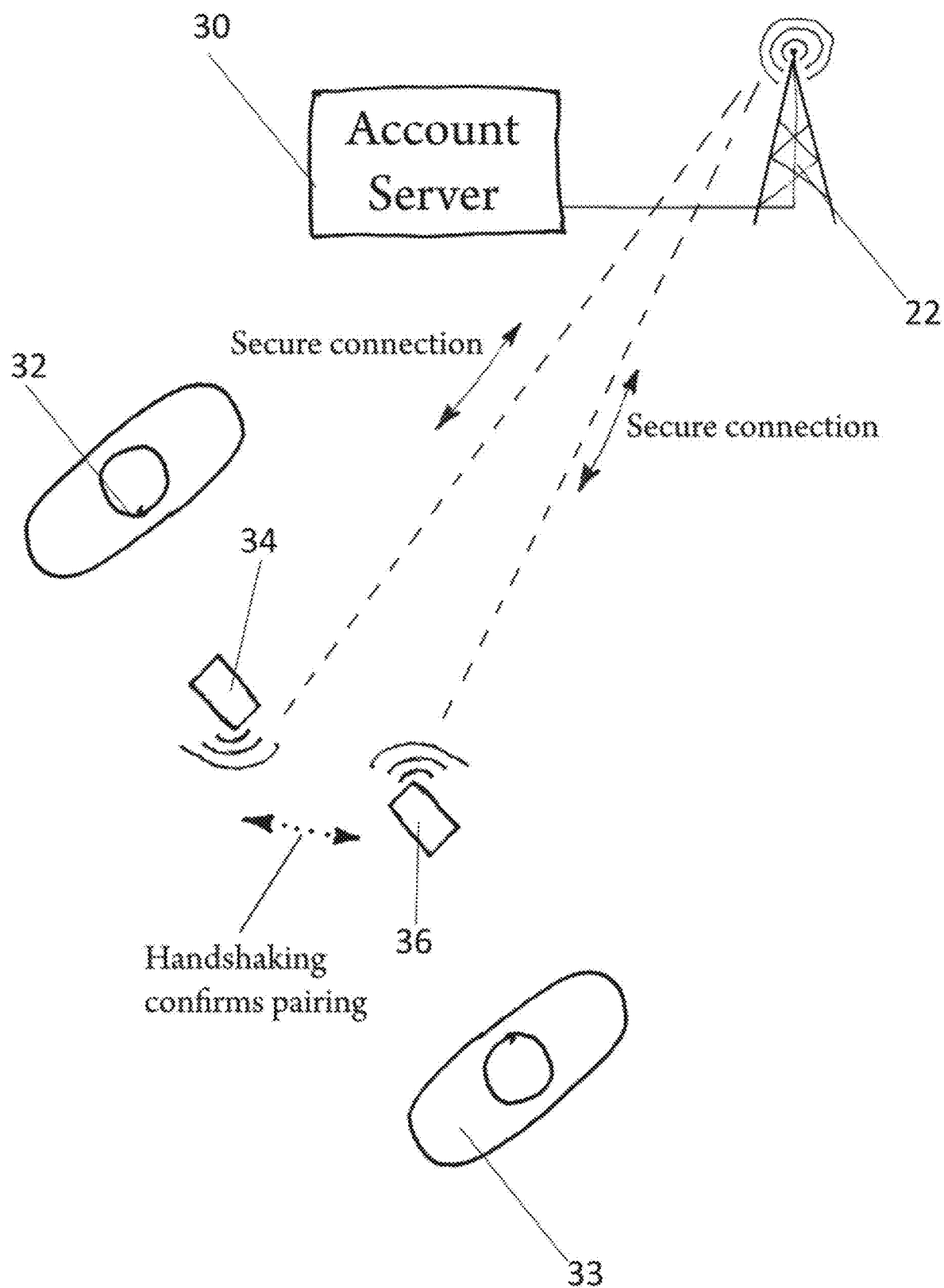
FIG. 3 is a block schematic diagram showing an alternative embodiment of a method and apparatus for conducting secure financial and informational transactions via portable smart devices according to the invention.
Figure 4:
FIGS. 4-7 are examples of barcodes that provide an easy way to provide information suitable for a romantic encounter (FIG. 4), a business meeting (FIG. 5), or access to documents such as prescriptions (FIG. 6), and medical records (FIG. 7)
Figure 5:
Figure 6:

FIG. 3 is a block schematic diagram showing an alternative embodiment of a method and apparatus for conducting secure financial and informational transactions via portable smart devices according to the invention. In FIG. 3, there are two smart connected devices 34, 36 in the possession of respective parties 32, 33 to the transaction, where each device is logged into an appropriate application. In this embodiment of the invention, the two independent devices are both securely connected to the same account server 30 and, therefore, only need to confirm their mutual identity to conduct a transaction. The banking app on the seller's smart device is used to request a TTN and the barcode is presented on the seller's smart device screen. The customer then proceeds as with an ATM transaction, but scans the barcode with their smart device camera from the seller's smart device instead of from an ATM screen, and then the DIN is entered on the seller's smart device.

Variation for Verbal Transactions Via Phone

The customer launches a smartphone banking app and requests a phone transaction. The banking app issues a TTN request to the account server, which is presented to the customer on the smart device. Then, the customer reads the TTN to the seller over the phone, which the seller enters on their computer or POS device. The server matches the two devices, and the seller's device presents the account nickname which the seller tells the customer. The seller then requests the DIN. The customer reviews the account nickname and, if correct, tells the seller the DIN. When the DIN is entered, handshaking is complete and the transaction can proceed.

This variation, where the customer's smart device requests the TTN instead of the seller's device may have advantages for some of the previous examples, for instance POS transactions, and is therefore an alternative embodiment of the invention for those applications.

Delegated Access

There are circumstances where it would be advantageous to delegate limited account access to a trusted third party. In embodiments of the invention, this feature is added to the account management app in the smart device and is configured by the account holder with various limitations, e.g. expiration date/time, withdrawal limit, deposit only, transaction confirmation via the account holder's device, etc. Once the account holder has configured the various options in the appropriate section of the banking app, the app requests a TTN from the account server which is then embedded in a barcode displayed on the screen of the account holder's smart device. The banking app on the delegate's smart device then activates that device's camera to photograph the account holder's displayed barcode, which is then resolved to the TTN and passed to the account server for confirmation. After exchanging DIN numbers, the desired account access is then registered with the delegate's smart device for subsequent use by the delegate, limited to the scope of authority originally established by the account holder for the delegate.

Additional Details

A retailer database of customer transactions is an essential capability, especially for returns. This capability may be retained if a customer number, similar to a credit/debit card number, but different from the account number or card number and specifically not usable for purchases or debits, is appended as part of the TTN. The retailer can then store this number locally instead of storing a credit/debit card number, which is a much safer approach for all parties. This number can be presented by the customer to the retailer for returning merchandise, discount club programs, etc. on a membership or customer type card, the number can be referenced as a barcode on invoices, or it can be accessed from the smartphone banking app as visible digits or as a barcode on the customer's smartphone.

In embodiments of the invention, POS hardware implementations may include a small screen for displaying the bar code instead of printing it on the invoice.

There is another class of devices, such as vending machines, that could be equipped with the proper hardware to enable them to communicate with account servers and smart devices, which would then give them the capability to conduct transactions using the herein disclosed technique.

In areas where cell phone data service is marginal, a local Wi-Fi capability may be required to enable the smart devices to connect to the account server.

Nonfinancial Transactions

Embodiments of the invention may also be used for non-financial transactions, e.g. two or more people may exchange limited and/or selected personal information.

Example

Two people who both use a social media application in which each user may maintain multiple profiles or personalities could share a subset of those profiles or personalities with each other.

For example, a gent met a lady and wished to acquire her contact information. The lady may well be reticent toward giving it out, even if she rather likes the gent. This is entirely understandable, as the gent may later prove to be less desirable than the lady originally imagined, or even to be relentless or harassing. Hence, the gent encounters resistance, and an opportunity may be lost; or the lady may be ready to share with the gent that she is a member of the local kennel club, but not her other interests or more personal information.

In embodiments of the invention, the gent may send the lady, via their respective smart devices and a social media application with the appropriate capability, access to a limited selection of his personal information and history as shown on his social media account. He selects the information to share, selects the option to embed a link in a barcode, and the barcode is then shown on his smartphone display. The lady then scans that barcode with her smart device's camera and the social media application on her smart device resolves and activates the link, and shows the gent's information which she could peruse then or later for help in determining if she in fact wants to befriend the gent and if so, to what degree.

Conversely, the lady could give the gent temporary access to a limited section of her account or profile which he could use to learn more about her and to contact her; she, in turn, could revoke or block his access at any time if in fact the gent turned out to be less than desirable or she tires of his attentions. For smart devices that have Voice Over Internet Protocol (VOIP) capability, the lady could even give the gent a revocable voice or video connection address through the social media application.

But there is a vulnerability involved: What if the person providing the contact information inadvertently instructs the app to provide more or less information than intended? To prevent this, the barcode generated by the app could have an embedded icon which would provide the person with a visual confirmation of the type of information encoded in the barcode. If more information is exposed than desired, then the barcode is not shown to the other person, and a new barcode can be requested, exposing the proper information.

EXAMPLES

Figure 7:

FIGS. 4-7 are examples of barcodes that provide an easy way to provide information suitable for a romantic encounter (FIG. 4), a business meeting (FIG. 5), or access to documents such as prescriptions (FIG. 6), and medical records (FIG. 7). This could lead to a market for the storage of such documents and for personalized icons much like today's ringtones.

Computer Implementation

Figure 8:
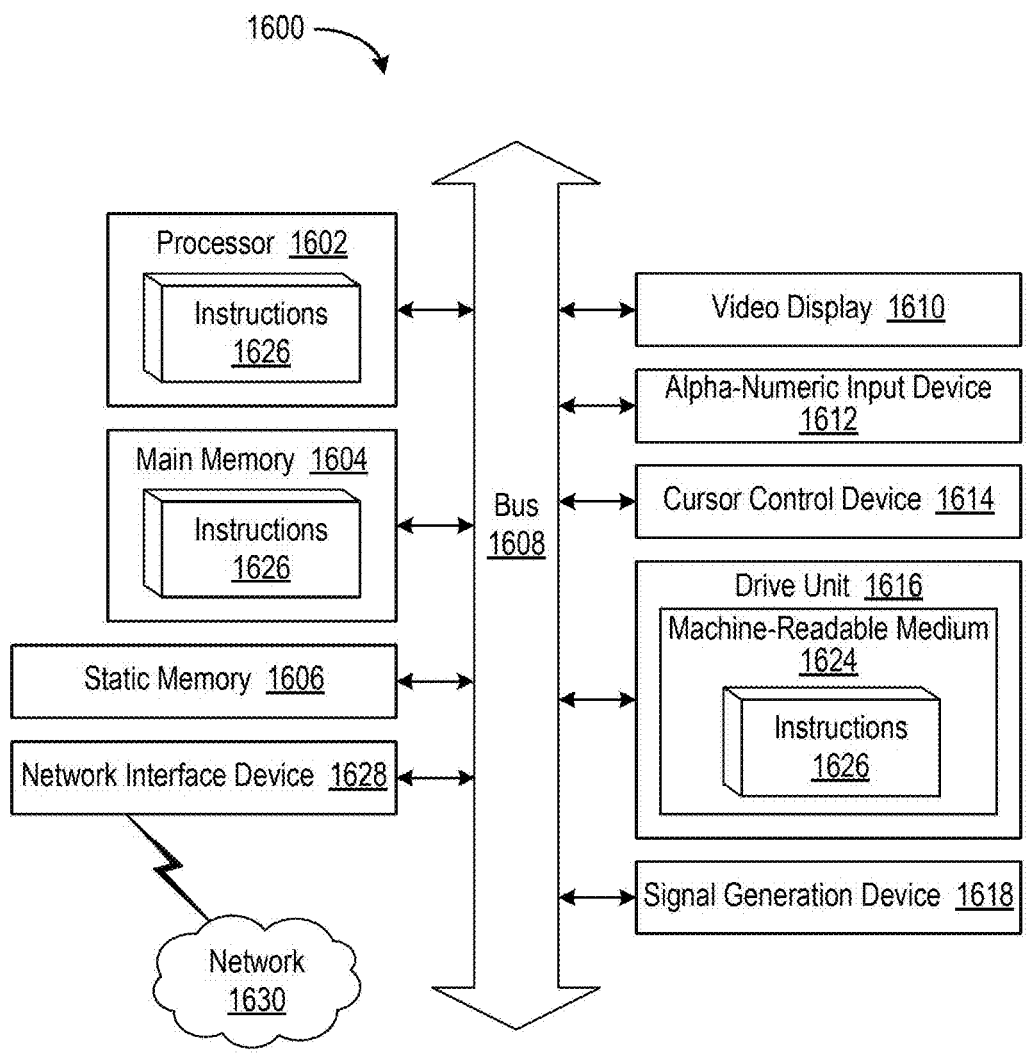
FIG. 8 is a block schematic diagram that depicts a machine in the exemplary form of a computer system within which a set of instructions for causing the machine to perform any of the herein disclosed methodologies may be executed.

FIG. 8 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant, a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

I claim:

1. A method for conducting any of secure financial and informational transactions, the method comprising:
connecting each of two transaction devices to a common account server by a secure connection between each transaction device and the account server,
wherein the two transaction devices are independent and substantially simultaneously accessible by a user, and
wherein each of the transaction devices connects to the account server independently at points in time;
upon substantially simultaneously connecting the two transaction devices to the account server, causing the account server to transmit to a first transaction device of the two transaction devices, unique information for transfer between the two transaction devices;
receiving a user input, via a second transaction device of the two transaction devices, in response to the unique information transmitted to the first transaction device, wherein the second transaction device is not paired with the first transaction device;
verifying the user input from the second transaction device with the unique information transmitted to the first transaction device;
in response to the verification, temporarily pairing of the two transaction devices once the two transaction devices are connected to the account server; and
authorizing a transaction between the user and a third party on one of the transaction devices.

2. The method of claim 1, wherein at least one of the transaction devices comprise one or more of: a smartphone or other smart device configured to connect to the account server.

3. The method of claim 1,
wherein a portion of the unique information is based on identity information for one of the two transaction devices, and
wherein the identity information causes the one of the two transaction devices to be in an unlocked state.

4. The method of claim 1, wherein the unique information comprises at least one of: an alphanumeric password or biometric information or a barcode,
wherein the alphanumeric password comprises a combination of letters, numbers, and special characters corresponding to the user, and
wherein the biometric information comprises unique physical or behavioral characteristics of the user, and
wherein the barcode comprises a machine-readable representation of the unique information for a corresponding user.

5. An account server for conducting secure financial and informational transactions, the account server comprising:
a processor; and
a memory including instructions that, when executed by the processor, cause the account server to:
independently connect two independent transaction devices,
wherein the transaction devices are simultaneously accessible to a user, and wherein the transaction devices are connected by a secure connection between each transaction device and the account server;

upon substantially simultaneously connecting the two transaction devices to the account server, causing the account server to transmit to a first transaction device of the two transaction devices, unique information for transfer between the two transaction devices; transmit the unique information to each of the two transaction devices;

receiving a user input, via a second transaction device of the two transaction devices, in response to the unique information transmitted to the first transaction device, wherein the second transaction device is not paired with the first transaction device;

verifying the user input from the second transaction device with the unique information transmitted to the first transaction device; and in response to the verification, temporarily pair the two transaction devices once connected to the account server; and authenticate a transaction between the user and a third party on one of the transaction devices.

6. The method of claim 1, further comprising:
receiving, via the account server, a request for the unique information from the first transaction device,
in response to receiving the request for the unique information from the first transaction device, causing the account server to transmit the unique information to the first transaction device, and
receiving, via the account server, the unique information from the second transaction device.

7. The method of claim 1, further comprising:
matching the user input with the unique information previously transmitted to the first transaction device, wherein the unique information is associated with a specific user account, and
in response to matching the user input with the unique information, linking the second transaction device to the specific user account.

8. The method of claim 1, further comprising:
causing the account server to transmit a request for login information, and
in response to receiving the login information via the first transaction device, authenticating the first transaction device.

9. The method of claim 8, further comprising:
causing performance of the transaction between the user and a third party on the one of the transaction devices.

10. The method of claim 1,
wherein the first transaction device and the second transaction device are associated with different users,
wherein the first transaction device includes a point-of-sale (POS) device.

11. The method of claim 10, wherein the account server, in response to a request from the point-of-sale (POS) device, is configured to:
generate a transaction tracking number (TTN) as the unique information, and
transmit the TTN to the POS device for presentation to a user.

12. The account server of claim 5, wherein the user input from the second transaction device includes a photograph of the unique information.

13. The account server of claim 5, wherein the unique information comprises an embedded icon which provides visual confirmation of a type of information encoded in the unique information.

14. The account server of claim 5, wherein the authenticated transaction is performed using a website during a user checkout, wherein the account server is further configured to:
receive a request for the unique information from the first transaction device; and
in response to receiving a request for the unique information from the first transaction device, transmit the unique information for display on the first transaction device within a browser presenting the website,
wherein the user input from the second transaction device includes a photograph of the unique information.

15. The account server of claim 5, wherein the user and the third party are different entities.

16. The account server of claim 5, wherein the account server is further configured to:
cause the first transaction device to launch an application on the first transaction device;
receive a request for the unique information from the application; and
receive the user input via the second transaction device, wherein the second transaction device is configured to receive the user input via third party input subsequent to a phone connection between the user and the third party.

17. The account server of claim 5,
delegate limited account access to the third party via an account management application on the second transaction device.

18. The account server of claim 17, wherein the limited account access limits access of the third party to the temporary pairing in accordance with one or more of: an expiration time, a withdrawal limit, a deposit-only restriction, or a transaction confirmation via a device of an account holder.

19. The account server of claim 5, wherein at least one of the transaction devices is associated with a social media application configured to access a limited selection of personal information of the user and a history of the user associated with a social media account of the user on the social media application, wherein the account server is further configured to:
receive, from the at least one transaction device, a selection of information to share on the social media application;
embed a link in the unique information, wherein the unique information comprises at least one of: an alphanumeric password, biometric information, or a barcode;
receive, from the second transaction device, a photograph of the unique information captured using a camera on the second transaction device; and
cause the account server to activate the embedded link via the social media application on the at least one transaction device.

20. The account server of claim 5, wherein the account server is further configured to block the temporary pairing of the two transaction devices.

* * * * *